US012726090B2

(12) United States Patent
Onda

(10) Patent No.: US 12,726,090 B2
(45) Date of Patent: Sep. 1, 2026

(54) METHOD AND APPARATUS FOR MANUFACTURING STATOR

(71) Applicant: TOYOTA JIDOSHA KABUSHIKI KAISHA, Toyota (JP)

(72) Inventor: Kazushi Onda, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 650 days.

(21) Appl. No.: 18/188,896

(22) Filed: Mar. 23, 2023

(65) Prior Publication Data

US 2023/0307998 A1 Sep. 28, 2023

(30) Foreign Application Priority Data

Mar. 28, 2022 (JP) ................................ 2022-052602

(51) Int. Cl.

| | |
|---|---|
| ***H02K 15/0643*** | (2025.01) |
| ***H02K 3/34*** | (2006.01) |
| ***H02K 15/108*** | (2025.01) |

(52) U.S. Cl.

CPC ......... *H02K 15/0643* (2025.01); *H02K 3/345* (2013.01); *H02K 15/108* (2025.01)

(58) Field of Classification Search

CPC .. H02K 15/0643; H02K 15/108; H02K 15/10; H02K 3/345

See application file for complete search history.

(56) References Cited

U.S. PATENT DOCUMENTS

2020/0287448 A1* 9/2020 Hosoda .................. B21K 23/00

FOREIGN PATENT DOCUMENTS

| | | | |
|---|---|---|---|
| CN | 111669011 | A | 9/2020 |
| JP | 2020-124055 | A | 8/2020 |
| JP | 2021-90323 | A | 6/2021 |
| JP | 2021-118638 | A | 8/2021 |
| WO | 2018/158871 | A1 | 9/2018 |
| WO | 2019/202624 | A1 | 10/2019 |

* cited by examiner

*Primary Examiner* — Livius R. Cazan

(74) *Attorney, Agent, or Firm* — Sughrue Mion, PLLC

(57) ABSTRACT

A method of manufacturing a stator that includes a tubular-shaped stator core and a tubular-shaped coil. The method includes: (a) a holding step of holding an insulation sheet, which is disposed in a slot provided in the stator core, by causing a pressing device to press the insulation sheet against an inner surface of the slot in an axial end portion of the stator core; (b) an inserting step of inserting a segment portion of the coil to an inside of the insulation sheet from a side of the axial end portion of the stator core, in a position distant from the pressing device that presses the insulation sheet against the inner surface of the slot; and (c) a retracting step of retracting the pressing device by extracting the pressing device from the slot, after the inserting step. Also disclosed is an apparatus for manufacturing the stator.

5 Claims, 11 Drawing Sheets

METHOD AND APPARATUS FOR MANUFACTURING STATOR

This application claims priority from Japanese Patent Application No. 2022-052602 filed on Mar. 28, 2022, the disclosure of which is herein incorporated by reference in its entirety.

FIELD OF THE INVENTION

The present invention relates to a method and an apparatus for manufacturing a stator, by inserting coil segments to an inside of an insulation sheet disposed in a slot of a stator core.

BACKGROUND OF THE INVENTION

There is known a method of manufacturing a stator by inserting coil segments to an inside of an insulation sheet which is rolled into a tubular shape and which is disposed in a slot of a stator core. For example, JP-2020-124055A discloses such a method of manufacturing a stator. In the disclosed method, in order to suppress occurrence of misalignment of the tubular-shaped insulation sheet, axially opposite end portions of the tubular-shaped insulation sheet are expanded to be tapered, before the coil segments are inserted to the inside of the tubular-shaped insulation sheet. Further, when the coil segments are to be inserted to the inside of the tubular-shaped insulation sheet from a side of an axial end portion of the tubular-shaped insulation sheet, the tubular-shaped insulation sheet is supported at another end portion thereof by a support plate.

SUMMARY OF THE INVENTION

By the way, also in the method disclosed in the above-identified Japanese Patent Application Publication, if the tubular-shaped insulation sheet has a small thickness, when the coil segments are inserted to the inside of the tubular-shaped insulation sheet, the tubular-shaped insulation sheet could be misaligned, for example, as a result of buckling or other deformation of the tubular-shape.

The present invention was made in view of the background art described above. It is therefore an object of the present invention to provide a method and an apparatus for manufacturing a stator, which are cable of suppressing occurrence of misalignment of the insulation sheet when the coil segments are inserted to the inside of the insulation sheet disposed in the slot.

The object indicated above is achieved according to the following aspects of the present invention.

According to a first aspect of the invention, there is provided a method of manufacturing a stator that includes a tubular-shaped stator core and a tubular-shaped coil, wherein the method includes: (a) a holding step of holding an insulation sheet, which is disposed in a slot provided in the stator core, by causing a pressing device to press the insulation sheet against an inner surface of the slot in an axial end portion of the stator core; (b) an inserting step of inserting a segment portion of the coil to an inside of the insulation sheet from a side of the axial end portion of the stator core, in a position distant from the pressing device that presses the insulation sheet against the inner surface of the slot; and (c) a retracting step of retracting the pressing device by extracting the pressing device from the slot, after the inserting step. It is noted that the "position distant from the pressing device" is, for example, "a position distant from the pressing device (that presses the insulation sheet against the inner surface of the slot) in a radial direction of the stator core in which the slot extends or is elongated".

According to a second aspect of the invention, in the method according to the first aspect of the invention, there is further provided, in addition to the inserting step as a first inserting step, a second inserting step of inserting a second segment portion of the coil that is other than the segment portion as a first segment portion, to the inside of the insulation sheet, in a position in which the pressing device has been extracted from the slot in the retracting step.

According to a third aspect of the invention, in the method according to the first or second aspect of the invention, the holding step is implemented by causing the pressing device to press the insulation sheet against a pair of side surfaces as portions of the inner surface of the slot which are opposed to each other in a circumferential direction of the stator core.

According to a fourth aspect of the invention, in the method according to the third aspect of the invention, the holding step is implemented by causing the pressing device to press the insulation sheet against the pair of side surfaces, on a side of one of inner and outer circumferential surfaces of the stator core in which the slot opens.

According to a fifth aspect of the invention, in the method according to any one of the first through fourth aspects of the invention, the holding step is implemented by causing the pressing device to press the insulation sheet against a bottom surface as a portion of the inner surface of the slot which connects between ends of a pair of side surfaces as portions of the inner surface of the slot which are opposed to each other in a circumferential direction of the stator core.

According to a sixth aspect of the invention, there is provided an apparatus for manufacturing a stator that includes a tubular-shaped stator core and a tubular-shaped coil. The apparatus includes: (a) a pressing device configured to hold an insulation sheet, which is disposed in a slot provided in the stator core, by pressing the insulation sheet against an inner surface of the slot in an axial end portion of the stator core; and (b) an inserting device configured to insert a segment portion of the coil to an inside of the insulation sheet from a side of the axial end portion of the stator core toward another axial end portion of the stator core, in a position distant from the pressing device that presses the insulation sheet against the inner surface of the slot.

According to a seventh aspect of the invention, in the apparatus according to the sixth aspect of the invention, there is further provided a second inserting device in addition to the inserting device as a first inserting device, wherein the second inserting device is configured, after the pressing device has been extracted from the slot, to insert a second segment portion of the coil that is other than the segment portion as a first segment portion, to the inside of the insulation sheet, in a position in which the pressing device has been extracted from the slot.

According to an eighth aspect of the invention, in the apparatus according to the sixth or seventh aspect of the invention, the pressing device includes a shaft member and a pivot member that is provided with first and second extending portions each extending in a direction away from the side of the axial end portion toward the other end portion, such that the first and second extending portions are pivotable about an axis of the shaft member. When the pressing device is moved in an axial direction of the tubular-shaped stator core and a distal end portion of the first extending portion is brought into contact with the axial end portion of the stator core, the first and second extending portions are pivoted and a distal end portion of the second extending portion presses the insulation sheet against the inner surface of the slot.

In the method according to the first aspect of the invention, there are provided (a) the holding step of holding the insulation sheet, which is disposed in the slot provided in the stator core, by causing the pressing device to press the insulation sheet against the inner surface of the slot in the axial end portion of the stator core, (b) the inserting step of inserting the segment portion of the coil to the inside of the insulation sheet from the side of the axial end portion of the stator core, in the position distant from the pressing device that presses the insulation sheet against the inner surface of the slot, and (c) the retracting step of retracting the pressing device by extracting the pressing device from the slot, after the inserting step. With the pressing device being caused to press the insulation sheet against the inner surface of the slot in the axial end portion of the stator core, a friction force is generated between the insulation sheet and the pressing device and between the insulation sheet and the inner surface of the slot. Therefore, when the segment portion is inserted to the inside of the insulation sheet from the side of the axial end portion of the stator core, occurrence of misalignment of the insulation sheet is suppressed owing to generation of the friction force whereby reduction of insulation between the stator core and the inserted segment portion of the coil is suppressed.

In the method according to the second aspect of the invention, the second inserting step is additionally provided to insert the second segment portion to the inside of the insulation sheet, in the position in which the pressing device has been extracted from the slot in the retracting step. In this arrangement in which the second segment portion is inserted to the inside of the insulation sheet in the position in which the pressing device has been extracted from the slot, as compared with in an arrangement in which the second segment portion is not inserted to the inside of the insulation sheet, it is possible to increase a number of segment portions, e.g., a number of coil segments, which are to be inserted into the same slot. Further, in this arrangement in which the first segment portion has been inserted to the inside of the insulation sheet by implementation of the first inserting step, as compared with in an arrangement in which the first segment portion has not been inserted to the inside of the insulation sheet, the misalignment of the insulation sheet is more unlikely to occur, owing to the friction force acting between the insulation sheet and the first segment portion. Thus, in the second inserting step in which the second segment portion is inserted to the inside of the insulation sheet in the position in which the pressing device has been extracted from the slot, the occurrence of misalignment of the insulation sheet is suppressed whereby the reduction of insulation between the stator core and the inserted segment portion of the coil is suppressed.

In the method according to the third aspect of the invention, the holding step is implemented by causing the pressing device to press the insulation sheet against the pair of side surfaces as portions of the inner surface of the slot which are opposed to each other in a circumferential direction of the stator core. When the segment portion of the coil is inserted to the inside of the insulation sheet, the insulation sheet receives a force, at its portions that are opposite to each other in the circumferential direction of the stator core, from the segment portion, wherein the force could cause the misalignment of the insulation sheet. Therefore, with the insulation sheet being pressed against the pair of side surfaces as portions of the inner surface of the slot, namely, with the insulation sheet being held at the above-described circumferentially opposite portions (at which the insulation sheet receives the force causing the misalignment), the occurrence of misalignment of the insulation sheet is suppressed at the above-described circumferentially opposite portions, whereby the reduction of insulation between the stator core and the inserted segment portion of the coil is suppressed.

In the method according to the fourth aspect of the invention, the holding step is implemented by causing the pressing device to press the insulation sheet against the pair of side surfaces, on the side of one the inner and outer circumferential surfaces of the stator core in which the slot opens. The insulation sheet is more likely to be moved in the circumferential direction, namely, closed, in its portion close to an opening of the slot, than in its portion distant from the opening in the radial direction. Where the segment portion is inserted to the inside of the insulation sheet, with the insulation sheet being held at its portion close to the opening of the slot, the segment portion can be inserted to the inside of the insulation sheet in a state in which the portion close to the opening of the slot being somewhat opened in the circumferential direction of the stator core. On the other hand, if the segment portion is inserted to the inside of the insulation sheet, with the insulation sheet being held at its portion distant from the opening of the slot in the radial direction of the stator core, the segment portion would have to be inserted to the inside of the insulation sheet without the state in which the portion close to the opening of the slot being opened in the circumferential direction of the stator core. Therefore, as compared with where the segment portion is inserted to the inside of the insulation sheet without the state in which the portion close to the opening of the slot being opened in the circumferential direction, where the segment portion is inserted to the inside of the insulation sheet with the state in which the portion close to the opening of the slot being opened in the circumferential direction, the segment portion is less likely to get caught on the insulation sheet, so as to be smoothly inserted to the inside of the insulation sheet.

In the method according to the fifth aspect of the invention, the holding step is implemented by causing the pressing device to press the insulation sheet against the bottom surface as a portion of the inner surface of the slot which connects between the ends of the pair of side surfaces as portions of the inner surface of the slot which are opposed to each other in the circumferential direction of the stator core. As compared with where the segment portion is inserted to the inside of the insulation sheet without the insulation sheet being pressed against the inner surface of the slot by the pressing device, where the segment portion is inserted to the inside of the insulation sheet with the insulation sheet being pressed against the bottom surface of the slot by the pressing device, it is possible to suppress the occurrence of misalignment of the insulation sheet and accordingly to suppress the reduction of insulation between the stator core and the inserted segment portion of the coil.

In the apparatus according to the sixth aspect of the invention, there are provided (a) the pressing device configured to hold the insulation sheet, which is disposed in the slot provided in the stator core, by pressing the insulation sheet against the inner surface of the slot in the axial end portion of the stator core; and (b) the inserting device configured to insert the segment portion of the coil to the inside of the insulation sheet from the side of the axial end portion of the stator core toward the other axial end portion of the stator core, in the position distant from the pressing device that presses the insulation sheet against the inner surface of the slot. With the pressing device being caused to press the insulation sheet against the inner surface of the slot in the axial end portion of the stator core, the friction force is generated between the insulation sheet and the pressing device and between the insulation sheet and the inner surface of the slot. Therefore, when the segment portion is inserted to the inside of the insulation sheet from the side of the axial end portion of the stator core, the occurrence of misalignment of the insulation sheet is suppressed whereby the reduction of insulation between the stator core and the inserted segment portion of the coil is suppressed.

In the apparatus according to the seventh aspect of the invention, there is further provided the second inserting device that is configured to insert the second segment portion of the coil to the inside of the insulation sheet, in the position in which the pressing device has been extracted from the slot. In this arrangement in which the second segment portion is inserted to the inside of the insulation sheet in the position in which the pressing device has been extracted from the slot, as compared with in an arrangement in which the second segment portion is not inserted to the inside of the insulation sheet, it is possible to increase a number of segment portions, e.g., a number of coil segments, which are to be inserted into the same slot. Further, in this arrangement in which the first segment portion has been inserted to the inside of the insulation sheet by operation of the first inserting device, as compared with in an arrangement in which the first segment portion has not been inserted to the inside of the insulation sheet, the misalignment of the insulation sheet is more unlikely to occur, owing to the friction force acting between the insulation sheet and the first segment portion. Thus, where the second segment portion is inserted to the inside of the insulation sheet in the position in which the pressing device has been extracted from the slot, the occurrence of misalignment of the insulation sheet is suppressed whereby the reduction of insulation between the stator core and the inserted segment portion of the coil is suppressed.

In the apparatus according to the eighth aspect of the invention, the pressing device includes the shaft member and the pivot member that is provided with the first and second extending portions each extending in the direction away from the side of the axial end portion toward the other axial end portion, such that the first and second extending portions are pivotable about the axis of the shaft member. Further, when the pressing device is moved in the axial direction of the tubular-shaped stator core and the distal end portion of the first extending portion is brought into contact with the axial end portion of the stator core, the first and second extending portions are pivoted and the distal end portion of the second extending portion presses the insulation sheet against the inner surface of the slot. When the distal end portion of the first extending portion is brought into contact with the axial end portion of the stator core as a result of movement of the pressing device in the axial direction of the stator core, the pivot member is pivoted such that the distal end portion of the second extending portion is automatically caused to press the insulation sheet against the inner surface. Thus, with the apparatus being provided with the pivot member that is simple in construction, it is possible to automatically cause the insulation sheet to be pressed against the inner surface of the slot.

DETAILED DESCRIPTION OF PREFERRED EMBODIMENTS

There will be described embodiments of the present invention in details with reference to drawings. It is noted that figures of the drawings are simplified or deformed as needed, and each portion is not necessarily precisely depicted in terms of dimension ratio, shape, angle, etc, for easier understanding of each of the embodiments. In the following description, "direction parallel to the axis C1", "circumferential direction of the stator core 12" and "radial direction of the stator core 12" will be simply referred to as "direction of the axis C1", "circumferential direction" and "radial direction", respectively.

First Embodiment

Figure 1:
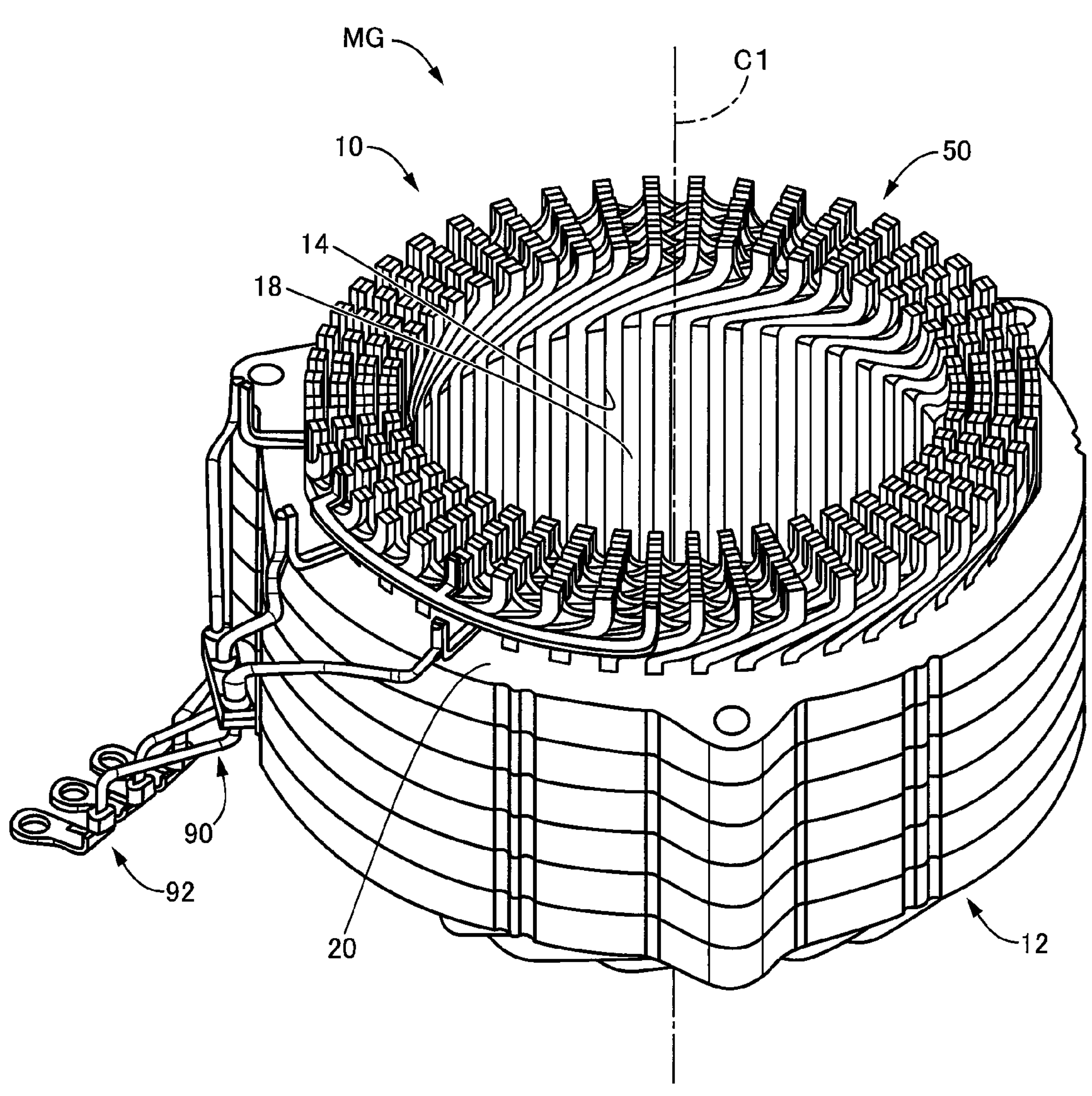
FIG. 1 is a perspective view schematically showing a construction of a stator for a rotary electric machine, wherein the stator is manufactured by a method according to the present invention.

FIG. 1 is a perspective view schematically showing a construction of a stator 10 for a rotary electric machine MG, wherein the stator is manufactured by a method according to the present invention.

The rotary electric machine MG is a rotary electric machine which is to be provided in a vehicle such as a hybrid vehicle and an electric vehicle and which has a function serving as an electric motor and a function serving as an electric power generator. That is, the rotary electric machine MG is a so-called motor generator. The rotary electric machine MG is a drive power source for driving the vehicle, for example. The rotary electric machine MG includes a tubular stator 10 whose center corresponds to an axis C1 and a rotor (not shown) that is disposed on an inner peripheral side of the stator 10. The rotor is to be rotated by a rotating magnetic field generated by the stator 10.

The stator 10 includes a tubular-shaped stator core 12, a tubular-shaped coil 50 and a power line 90. The stator core 12 has a cylindrical body whose center lies on the axis CL, wherein the cylindrical body is constituted by a plurality of electromagnetic steel plates laminated on each other. Although it is preferable that the stator core 12 has a cylindrical shape, a cross sectional shape of the stator core 12 does not necessarily have to be a circular shape, as long as the stator core 12 has a tubular shape.

The tubular-shaped coil 50 has a cylindrical body whose center lies on the axis C1. In an inner circumferential surface 12*i* of the tubular-shaped stator core 12, there are provided a plurality of groove portions, i.e., slots 14 that are located at equal angular intervals around the axis C1. Each of the slots 14 has a predetermined depth in the radial direction toward an outer peripheral side of the stator core 12, and extends throughout the stator core 12 in a direction of the axis C1. Each of the slots 14 has an opening 14*o* (see FIG. 5) that opens in the inner circumferential surface 12*i* of the stator core 12. Each of the slots 14 is defined between a corresponding circumferentially adjacent pair of tooth portions 18 that are also located at equal angular intervals around the axis C1. As described later, coil segments 52 are inserted in the slots 14 and are connected to one another whereby the coil 50 are wound on the tooth portions 18. The tooth portions 18 constitute a part serving as electromagnets with an alternating current being caused to pass through the coil 50. The stator core 12 includes a yoke portion 20 that is other than the tooth portions 18. The yoke portion 20 serves as a path of magnetic field lines between the tooth portions 18 that serve as electromagnets. It is noted that the stator core 12 does not necessarily have to be constituted by the plurality of electromagnetic steel plates that are laminated on each other, but may be formed by molding electromagnetic powder, solid or the like. In an example shown in FIG. 1, the coil 50 is wound in a distributed winding in which the coil 50 is wound across the plurality of slots 14.

The coil 50 is a three-phase coil for U-phase, V-phase and W-phase, for example, and an end portion of each phase of the coil 50 is electrically connected to the power line 90. The power line 90 is connected at its distal end portion to an external terminal 92, so as to be connected to an inverter or the like.

Figure 2:
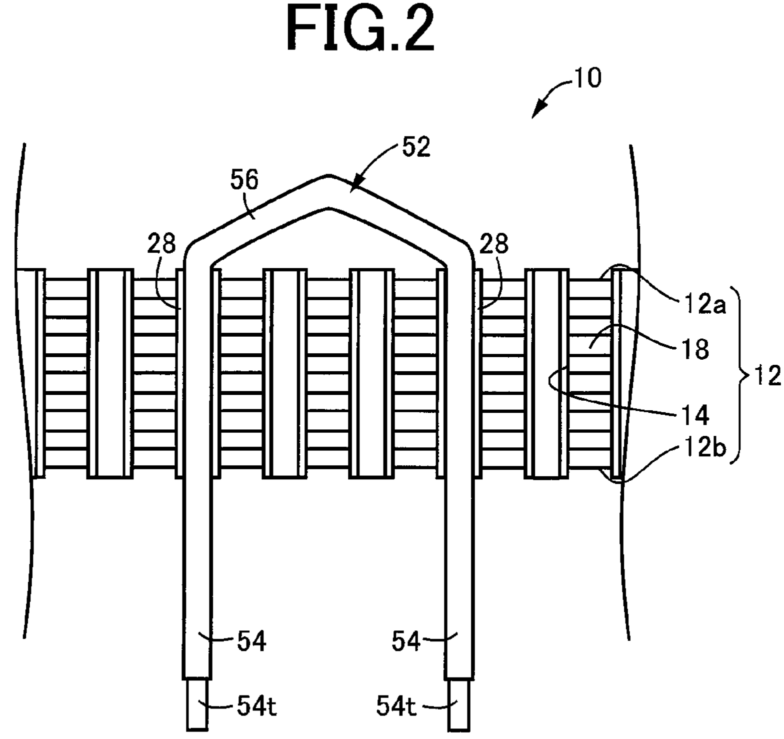
FIG. 2 is a view for schematically explaining a process of winding a coil on a stator core of the stator shown in FIG. 1.
Figure 3:
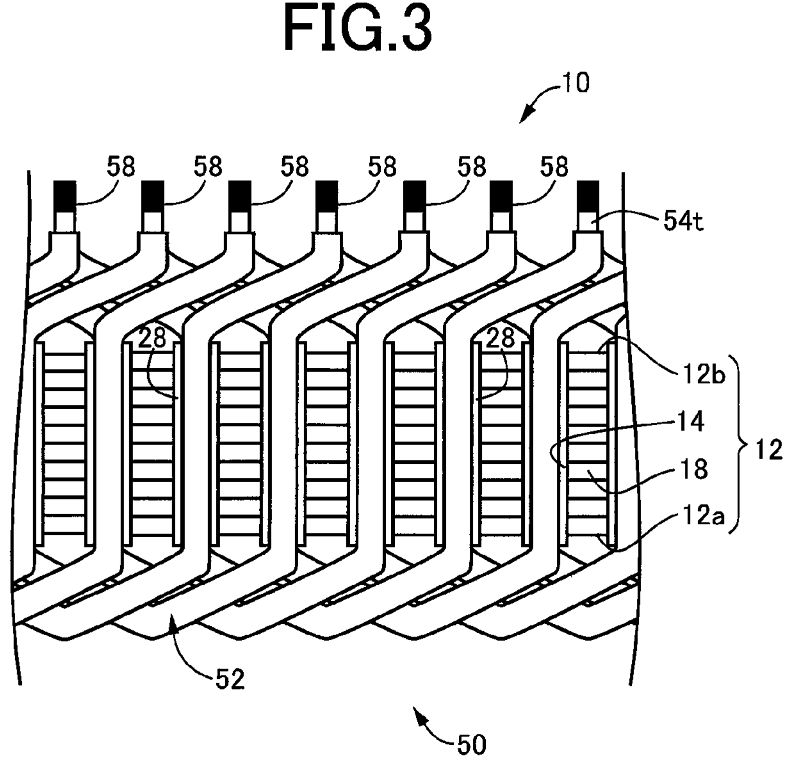
FIG. 3 is also a view for schematically explaining the process of winding the coil on the stator core of the stator shown in FIG. 1.

FIG. 2 and FIG. 3 are views for schematically explaining a process of winding the coil 50 on the stator core 12 of the rotary electric machine MG shown in FIG. 1. The view of FIG. 2 is a development view of the inner circumferential surface 12*i* of the stator core 12 and shows one of the coil segments 52 inserted in the slots 14. In each of the slots 14, arm portions of corresponding plurality of coil segments 52 (corresponding eight of the coil segments 52 in the present embodiment), which are arranged in the radial direction, are inserted. The view of FIG. 3 is a development view of the inner circumferential surface of the stator core 12 and shows a state in which the coil segments 52 are connected by welding.

Each of the coil segments 52 inserted in the slots 14 is constituted by, for example, a so-called rectangular conductor, i.e., an elongated conductor plate having a rectangular cross-sectional shape, such that an insulation film made of enamel or the like is provided to cover a surface of the rectangular conductor. Each of the coil segments 52 is bent to have a substantially U shape, and includes a pair of arm portions 54 and a connection portion 56. The pair of arm portions 54 straightly extend in substantially the same direction. The connection portion 56 connects between proximal end portions of the respective arm portions 54. The arm portions 54 have respective distal end portions 54*t* that are not covered with the insulation film.

As shown in FIG. 2, firstly, the arm portions 54 of each of the coil segments 52 are inserted into the respective slots 14, from a side of an axial end portion 12*a* of the stator core 12 toward another axial end portion 12*b* of the stator core 12, such that the connection portion 56 of each of the coil segments 52 is brought into contact with the axial end portion 12*a* of the stator core 12, and such that the distal end portions 54*t* of the respective arm portions 54 of each of the coil segments 52 protrude from the other axial end portion 12*b* of the stator core 12. It is noted that the axial end portion 12*a* of the stator core 12 is one of end portions of the stator core 12 which are opposite to each other in the direction of the axis C1, and that the other axial end portion 12*b* of the stator core 12 is the other of the end portions of the stator core 12.

Next, as shown in FIG. 3, the distal end portions 54*t* of the arm portions 54 of the coil segments 52, which protrude from the other axial end portion 12*b* of the stator core 12, are bent in the circumferential direction. Then, one of the distal end portions 54*t* of each of the coil segments 52 and one of the distal end portions 54*t* of another one of the coil segments 52 are welded to each other, so as to cooperate with each other to constitute a welded portion 58. Thus, the plurality of coil segments 52 are electrically connected through the welded portions 58 to one another, whereby the coil 50 are wound on the tooth portions 18. Each of the welded portions 58 is formed by TIG (Tungsten Inert Gas) welding, for example.

FIGS. 2 and 3 are views for conceptually explaining the process of winding the coil 50 on the stator core 12 of the stator 10. Actually, for example, the plurality of coil segments 52, which are identical in shape with one another, are combined to one another to have a tubular shape, and are inserted in the slots 14, and the inserted coil segments 52 are welded to one another whereby the tubular-shaped coil 50 is formed.

There will be described in details the method of manufacturing the stator 10, particularly, the process of inserting the coil segments 52.

Figure 4:
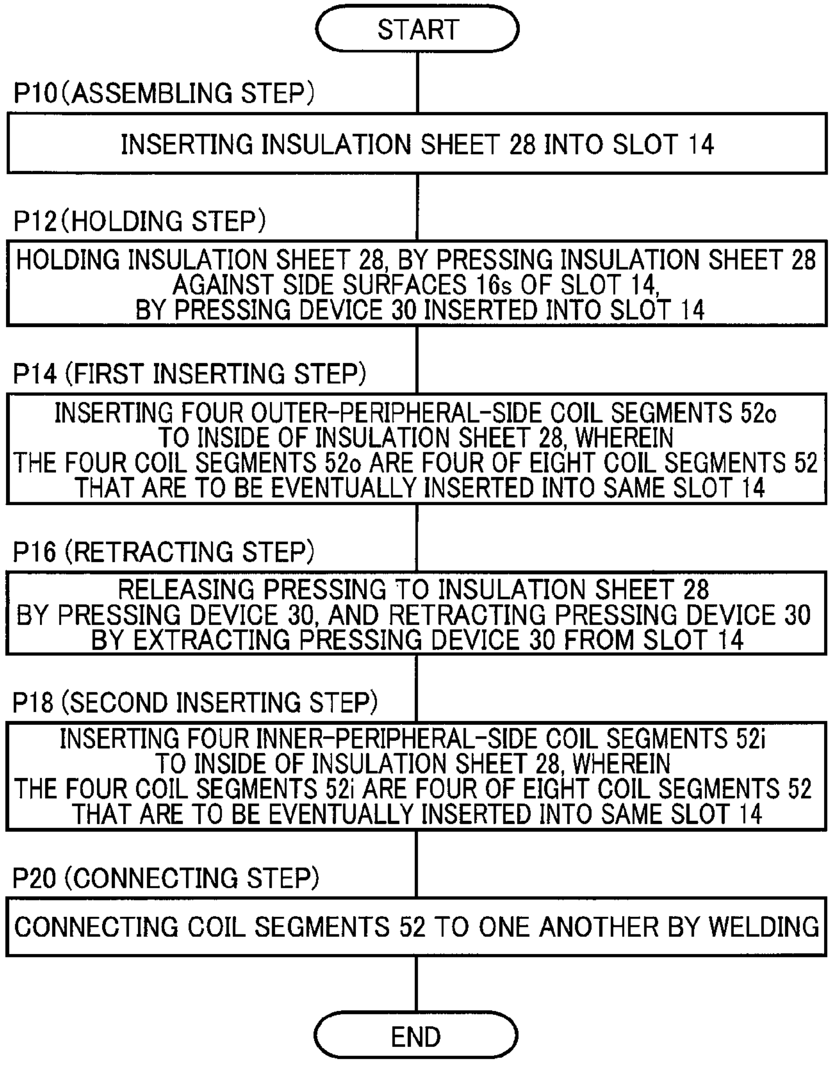
FIG. 4 is a diagram for explaining each step of the method of manufacturing the stator, according to a first embodiment of the present invention.

FIG. 4 is a diagram for explaining each step of the method of manufacturing the stator 10, according to a first embodiment of the present invention. The manufacturing method includes an assembling step P10, a holding step P12, a first inserting step P14, a retracting step P16, a second inserting step P18 and a connecting step P20, which are to be implemented sequentially in this order of description. The stator 10 in which the coil segments 52 are inserted into insulation sheets 28 disposed in the slots 14, is manufactured by a coil inserting apparatus 80 that is described below.

The assembling step P10 is a step implemented to insert the insulation sheet 28 into each of the slots 14. Each slot 14 has an inner wall surface 16 that includes a pair of side surfaces 16*s* that are opposed to each other in the circumferential direction (see FIG. 5) and a bottom surface 16*b* connecting between outer-peripheral-side ends of the respective side surfaces 16*s* (see FIG. 5). The inner wall surface 16 serves as a lateral surface defining each slot 14 in the stator core 12. It is noted that the inner wall surface 16 corresponds "inner surface (of the slot)" recited in the appended claims. The side surfaces 16*s* are portions of the inner wall surface 16 that are opposed to each other in the circumferential direction. The insulation sheet 28 is, for example, an insulation paper that is formed to have a shape corresponding to a shape of each slot 14, so as to be contactable with the inner wall surface 16 of each slot 14. That is, the insulation sheet 28 is disposed to be opposed to the inner wall surface 16. The insulation sheet 28 is provided to assure insulation between the stator core 12 and the coil segments 52 that are inserted to an inside of the insulation sheet 28.

The holding step P12 is a step implemented to hold the insulation sheet 28, by pressing the insulation sheet 28 against the inner wall surface 16 of each slot 14 by an operation of a pressing device 30 that is inserted into the slot 14. The first inserting step P14 is a step implemented to insert four outer-peripheral-side coil segments 52*o* to the inside of the insulation sheet 28, wherein the four outer-peripheral-side coil segments 52*o* are four of eight coil segments 52 that are to be eventually inserted into each slot 14. The retracting step P16 is a step implemented to release pressing to the insulation sheet 28 by the pressing device 30 and then to retract the pressing device 30 by extracting the pressing device 30 from the slot 14. The second inserting step P18 is a step implemented to insert four inner-peripheral-side coil segments 52*i* to the inside of the insulation sheet 28, wherein the four inner-peripheral-side coil segments 52*i* are other four of the eight coil segments 52 that are to be eventually inserted into each slot 14. The connecting step P20 is a step implemented to electrically connect the coil segments 52 to one another by welding, so as to form the tubular-shaped coil 50. In the present embodiment, the outer-peripheral-side coil segments 52*o* and the inner-peripheral-side coil segments 52*i* correspond to "first segment portion" and "second segment portion", respectively, which are recited in the appended claims.

Figure 5:
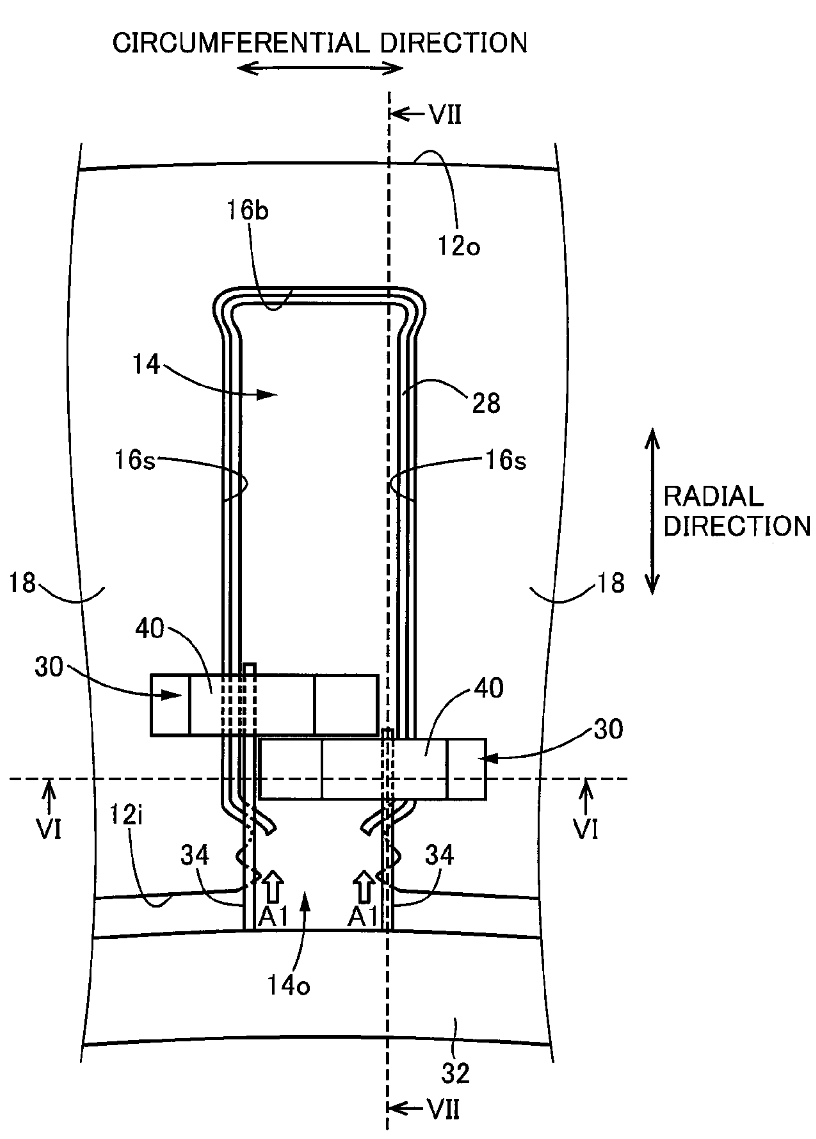
FIG. 5 is a view for explaining a holding step shown in FIG. 4.
Figure 6:
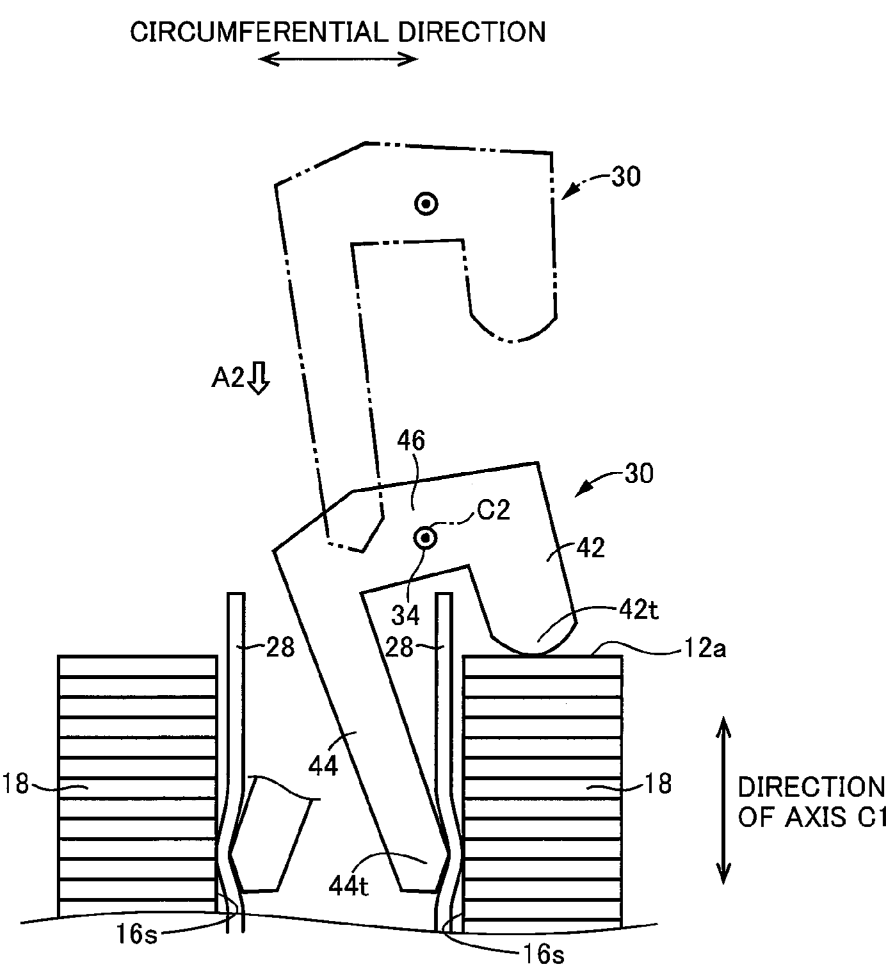
FIG. 6 is a view showing construction of a pressing device shown in FIG. 5.

FIG. 5 is a view for explaining the holding step P12 shown in FIG. 4. FIG. 6 is a cross sectional view taken in line VI-VI shown in FIG. 5 and showing construction of the pressing device 30 shown in FIG. 5.

Figure 7:
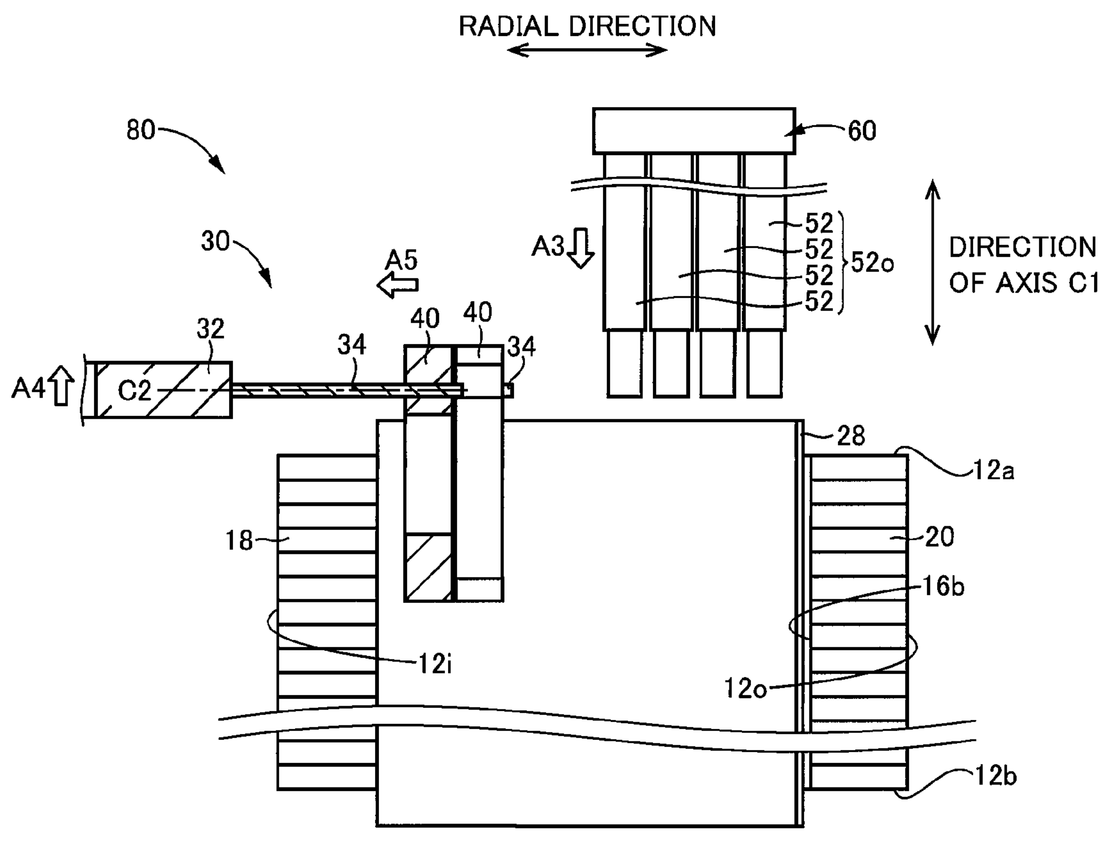
FIG. 7 is a view for explaining a first inserting step and a retracting step shown in FIG. 4.
Figure 8:
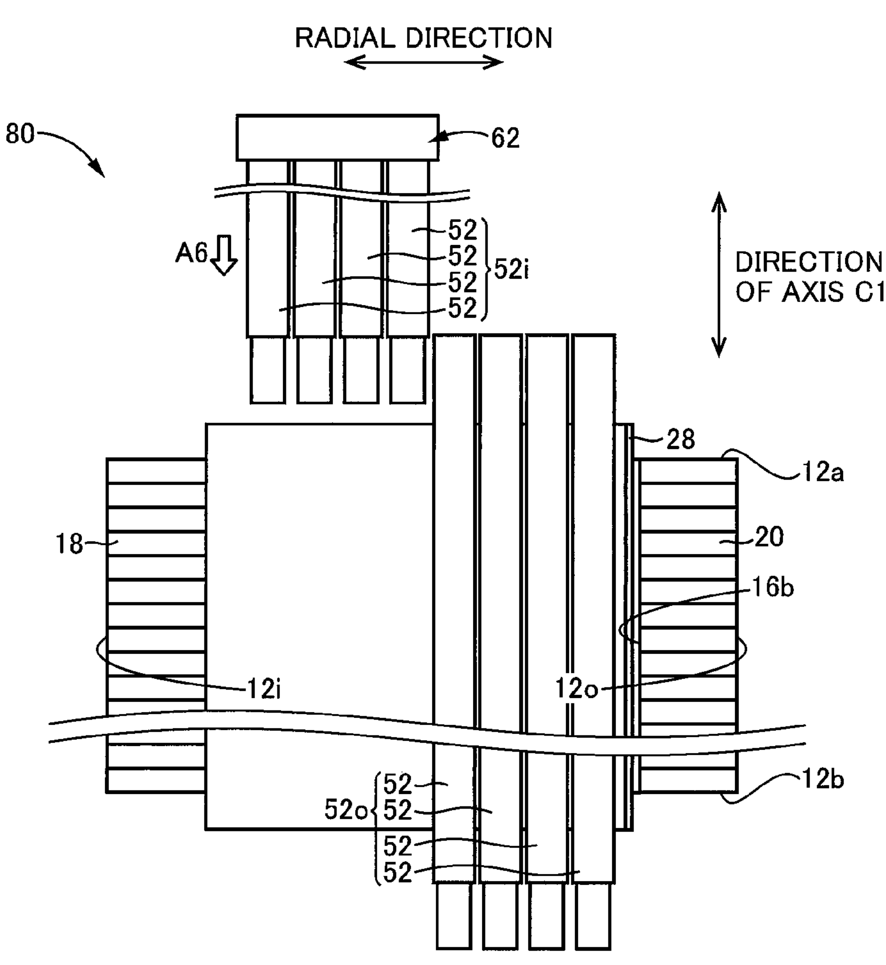
FIG. 8 is a view for explaining a second inserting step shown in FIG. 4.

The coil inserting apparatus 80 includes an outer-peripheral-side inserting device 60, an inner-peripheral-side inserting device 62 in addition to the above-described pressing device 30 (see FIGS. 7 and 8). The coil inserting apparatus 80 corresponds to "apparatus" recited in the appended claims. It is noted that the direction of the axis C1 corresponds to a vertical direction in a stage shown in each of FIGS. 5-8.

The pressing device 30 includes an annular-shaped support member 32, shaft members 34 and pivot members 40, wherein two sets of the shaft members 34 and the pivot members 40 are provided in a position corresponding to each one of the slots 14. The annular-shaped support member 32 is an annular member disposed inside the inner circumferential surface 12*i* of the stator core 12, for example. The two sets are substantially the same as each other in terms of constructions of the shaft member 34 and pivot member 40. However, the two sets are different from each other in terms of a direction in which the insulation sheet 28 is pressed against the inner wall surface 16 of each slot 16. Specifically, the insulation sheet 28 is pressed against one of the side surfaces 16*s* by one of the two sets, and the insulation sheet 28 is pressed against the other of the side surfaces 16*s* by the other of the two sets (see FIG. 6). Hereinafter, only one of the two sets will be described.

The shaft member 34 is provided in a position of a corresponding one of the slots 14, and protrudes from the annular-shaped support member 32 outwardly in the radial direction. The pivot member 40 is pivotable about the axis C2 of the shaft member 34.

The pressing device 30 is movable in the direction of the axis C1, i.e., in the vertical direction in FIGS. 6 and 7. The shaft member 34 is extendable from the annular-shaped support member 32 outwardly in the radial direction and retractable toward the annular-shaped support member 32 inwardly in the radial direction, for example, by operation of an actuator (not shown). The shaft member 34 is supported by the annular-shaped support member 32. The pivot member 40 includes first and second extending portions 42, 44 and a connecting portion 46. Each of the first and second extending portions 42, 44 extends generally in the direction of the axis C1 from a side of the axial end portion 12*a* toward the other axial end portion 12*b*. The connecting portion 46 connects between proximal end portions of the respective first and second extending portions 42, 44. It is preferable that the second extending portion 44 extends from the side of the axial end portion 12*a* more than the first extending portion 42, toward the other axial end portion 12*b*. The connecting portion 46 is supported by the shaft member 34.

The outer-peripheral-side inserting device 60 is movable upwardly and downwardly in the vertical direction, and is capable of grabbing and releasing the outer-peripheral-side coil segments 52*o*. Thus, the outer-peripheral-side inserting device 60 is capable of inserting the outer-peripheral-side coil segments 52*o* from the side of the axial end portion 12*a* to the inside of the insulation sheet 28 while grabbing the outer-peripheral-side coil segments 52*o*. The inner-peripheral-side inserting device 62 is movable upwardly and downwardly in the vertical direction, and is capable of grabbing and releasing the inner-peripheral-side coil segments 52*i*. Thus, the inner-peripheral-side inserting device 62 is capable of inserting the inner-peripheral-side coil segments 52*i* from the side of the axial end portion 12*a* to the inside of the insulation sheet 28 while grabbing the inner-peripheral-side coil segments 52*i*. In the present embodiment, the outer-peripheral-side inserting device 60 and the inner-peripheral-side inserting device 62 correspond to "first inserting device" and "second inserting device", respectively, which are recited in the appended claims.

Firstly, as indicated by arrow A1 in FIG. 5, the shaft member 34 is caused to extend from the annular-shaped support member 32 outwardly in the radial direction, while the pressing device 30 is positioned on an upper side of the axial end portion 12*a* in the vertical direction, so that the first extending portion 42 of the pivot member 40 is positioned right above the corresponding tooth portion 18 while the second extending portion 44 of the pivot member 40 is positioned right above a side of the opening 14*o* of the corresponding slot 14, as seen from the vertical direction. The side of the opening 14*o* means a position closer than the bottom surface 16*b* to the opening 14*o* in the radial direction. Next, as indicated by arrow A2 in FIG. 6, the pressing device 30 is moved downwardly in the vertical direction, so that a distal end portion 44*t* of the second extending portion 44 is inserted into the corresponding slot 14 while a distal end portion 42*t* of the first extending portion 42 is brought into contact with the axial end portion 12*a* of the stator core 12 in the corresponding tooth portions 18. With the distal end portion 42*t* of the first extending portion 42 being brought into contact with the axial end portion 12*a*, the pivot member 40 is pivoted and accordingly the distal end portion 44*t* of the second extending portion 44 is caused to press the insulation sheet 28 against a corresponding one of the pair of side surfaces 16*s* of the corresponding slot 14. It is noted that the distal end portion 42*t* and the distal end portion 44*t* correspond to "distal end portion (of the first extending portion)" and "distal end portion (of the second extending portion)", respectively, which are recited in the appended claims.

FIG. 7 is a view for explaining the first inserting step P14 and the retracting step P16 that are shown in FIG. 4, wherein the view is a cross sectional view taken in line VII-VII shown in FIG. 5.

The first inserting step P14 is a step implemented to cause the outer-peripheral-side inserting device 60 to insert the four outer-peripheral-side coil segments 52*o* to the inside of the insulation sheet 28 from the side of the axial end portion 12*a* of the stator core 12 toward the other axial end portion 12*b* of the stator core 12, in a position distant from the pressing device 30 that holds the insulation sheet 28, namely, in a position outwardly of the pressing device 30 in the radial direction within the corresponding slot 14, as indicated by arrow A3 shown in FIG. 7.

After the first inserting step P14, the retracting step P16 is implemented to move the pressing device 30 upwardly in the vertical direction, as indicated by arrow A4 shown in FIG. 7, and then to retract the shaft member 34 inwardly in the radial direction (toward the annular-shaped support member 32) while the pressing device 30 is in a position located on the upper side of the axial end portion 12*a* in the vertical direction, as indicated by arrow A5 shown in FIG. 7. Thus, the pressing device 30 is retracted from a position in which the four inner-peripheral-side coil segments 52*i* are to be inserted to the inside of the insulation sheet 28 as described below.

FIG. 8 is a view for explaining the second inserting step P18 shown in FIG. 4. After the retracting step P16, the second inserting step P18 is implemented to cause the inner-peripheral-side inserting device 62 to insert the four inner-peripheral-side coil segments 52*i* to the inside of the insulation sheet 28 from the side of the axial end portion 12*a* toward the other axial end portion 12*b*, in the position in which the pressing device 30 has been extracted from the corresponding slot 14, as indicated by arrow A6 shown in FIG. 8.

In the method of manufacturing the stator 10, according to the present embodiment, there are provided (a) the holding step P12 of holding the insulation sheet 28, which is disposed in the slot 14 provided in the stator core 12, by causing the pressing device 30 to press the insulation sheet 28 against the pair of side surfaces 16*s* of the slot 14 in the axial end portion 12*a* of the stator core 12, (b) the first inserting step P14 of inserting the outer-peripheral-side coil segments 52*o* of the coil 50 to the inside of the insulation sheet 28 from the side of the axial end portion 12*a* of the stator core 12, in the position distant from the pressing device 30 that presses the insulation sheet 28 against the pair of side surfaces 16*s* of the slot 14, and (c) the retracting step P16 of retracting the pressing device 30 by extracting the pressing device 30 from the slot 14, after the first inserting step P14. With the pressing device 30 being caused to press the insulation sheet 28 against the pair of side surfaces 16*s* of the slot 14 in the axial end portion 12*a* of the stator core 12, the friction force is generated between the insulation sheet 28 and the pressing device 30 and between the insulation sheet 28 and the pair of side surfaces 16*s* of the slot 14. When the outer-peripheral-side coil segments 52*o* are inserted to the inside of the insulation sheet 28, the insulation sheet 28 receives a force, at its portions that are opposite to each other in the circumferential direction of the stator core 12, from the outer-peripheral-side coil segments 52*o*, wherein the force could cause the misalignment of the insulation sheet 28. Therefore, with the insulation sheet 28 being pressed against the pair of side surfaces 16*s* of the slot 14, namely, with the insulation sheet 28 being held at the above-described circumferentially opposite portions (at which the insulation sheet 28 receives the force causing the misalignment), the occurrence of misalignment of the insulation sheet 28 is suppressed at the above-described circumferentially opposite portions, whereby the reduction of insulation between the stator core 12 and the inserted coil segments 52 is suppressed.

In the method of manufacturing the stator 10, according to the present embodiment, the second inserting step P18 is additionally provided to insert the inner-peripheral-side coil segments 52*i* to the inside of the insulation sheet 28, in the position in which the pressing device 30 has been extracted from the slot 14 in the retracting step P16. In this arrangement in which the inner-peripheral-side coil segments 52*i* are inserted to the inside of the insulation sheet 28 in the position in which the pressing device 30 has been extracted from the slot 14, as compared with in an arrangement in which the inner-peripheral-side coil segments 52*i* are not inserted to the inside of the insulation sheet 28, it is possible to increase a number of the coil segments 52, which are to be inserted into the same slot 14. Further, in this arrangement in which the outer-peripheral-side coil segments 52*o* have been inserted to the inside of the insulation sheet 28 by implementation of the first inserting step P14, as compared with in an arrangement in which the outer-peripheral-side coil segments 52*o* have not been inserted to the inside of the insulation sheet 28, the misalignment of the insulation sheet 28 is more unlikely to occur, owing to the friction force acting between the insulation sheet 28 and the outer-peripheral-side coil segments 52*o*. Thus, in the second inserting step P18 in which the inner-peripheral-side coil segments 52*i* are inserted to the inside of the insulation sheet 28 in the position in which the pressing device 30 has been extracted from the slot 14, the occurrence of misalignment of the insulation sheet 28 is suppressed whereby the reduction of insulation between the stator core 12 and the inserted coil segments 52 is suppressed.

In the method of manufacturing the stator 10, according to the present embodiment, the holding step P12 is implemented by causing the pressing device 30 to press the insulation sheet 28 against the pair of side surfaces 16*s*, on the side of the inner circumferential surface 12*i* of the stator core 12 in which the opening 14*o* of the slot 14 is located. The insulation sheet 28 is more likely to be moved in the circumferential direction, namely, closed, in its portion close to the opening 14*o* of the slot 14, than in its portion distant from the opening 14*o* in the radial direction. Where the outer-peripheral-side coil segments 52*o* are inserted to the inside of the insulation sheet 28, with the insulation sheet 28 being held at its portion close to the opening 14*o* of the slot 14, the outer-peripheral-side coil segments 52*o* can be inserted to the inside of the insulation sheet 28 in a state in which the portion close to the opening 14*o* of the slot 14 being somewhat opened in the circumferential direction of the stator core 12 by the pressing device 30. On the other hand, if the outer-peripheral-side coil segments 52*o* are inserted to the inside of the insulation sheet 28, with the insulation sheet 28 being held at its portion distant from the opening 14*o* of the slot 14 in the radial direction of the stator core 12, the outer-peripheral-side coil segments 52*o* would have to be inserted to the inside of the insulation sheet 28 without the state in which the portion close to the opening 14*o* of the slot 14 being opened in the circumferential direction of the stator core 12. Therefore, as compared with where the outer-peripheral-side coil segments 52*o* are inserted to the inside of the insulation sheet 28 without the state in which the portion close to the opening of the slot 14 being opened in the circumferential direction, where the outer-peripheral-side coil segments 52*o* are inserted to the inside of the insulation sheet 28 with the state in which the portion close to the opening of the slot 14 being opened in the circumferential direction, the peripheral-side coil segments 52 are less likely to get caught on the insulation sheet 28, so as to be smoothly inserted to the inside of the insulation sheet 28.

In the coil inserting apparatus 80 according to the present embodiment, there are provided (a) the pressing device 30 configured to hold the insulation sheet 28, which is disposed in the slot 14 provided in the stator core 12, by pressing the insulation sheet 28 against the pair of side surfaces 16*s* of the slot 14 in the axial end portion 12*a* of the stator core 12; and (b) the outer-peripheral-side inserting device 60 configured to insert the outer-peripheral-side coil segments 52*o* of the coil 50 to the inside of the insulation sheet 28 from the side of the axial end portion 12*a* of the stator core 12 toward the other axial end portion 12*b* of the stator core 12, in the position distant from the pressing device 30 that presses the insulation sheet 28 against the pair of side surfaces 16*s* of the slot 14. With the pressing device 30 being caused to press the insulation sheet 28 against the pair of side surfaces 16*s* of the slot 14 in the axial end portion 12*a* of the stator core 12, the friction force is generated between the insulation sheet 28 and the pressing device 30 and between the insulation sheet 28 and the pair of side surfaces 16*s* of the slot 14. Therefore, when the outer-peripheral-side coil segments 52*o* are inserted to the inside of the insulation sheet 28 from the side of the axial end portion 12*a* of the stator core 12, the occurrence of misalignment of the insulation sheet 28 is suppressed whereby the reduction of insulation between the stator core 12 and the inserted coil segments 52 is suppressed.

In the coil inserting apparatus 80 according to the present embodiment, there is further provided the inner-peripheral-side inserting device 62 that is configured to insert the inner-peripheral-side coil segments 52*i* of the coil 50 to the inside of the insulation sheet 28, in the position in which the pressing device 30 has been extracted from the slot 14. In this arrangement in which the inner-peripheral-side coil segments 52*i* are inserted to the inside of the insulation sheet 28 in the position in which the pressing device 30 has been extracted from the slot 14, as compared with in an arrangement in which the inner-peripheral-side coil segments 52*i* are not inserted to the inside of the insulation sheet 28, it is possible to increase the number of coil segments 52, which are to be inserted into the same slot 14. Further, in this arrangement in which the outer-peripheral-side coil segments 52*o* have been inserted to the inside of the insulation sheet 28 by operation of the outer-peripheral-side inserting device 60, as compared with in an arrangement in which the outer-peripheral-side coil segments 52*o* have not been inserted to the inside of the insulation sheet 28, the misalignment of the insulation sheet 28 is more unlikely to occur, owing to the friction force acting between the insulation sheet 28 and the outer-peripheral-side coil segments 52*o*. Thus, where the inner-peripheral-side coil segments 52*i* are inserted to the inside of the insulation sheet 28 in the position in which the pressing device 30 has been extracted from the slot 14, the occurrence of misalignment of the insulation sheet 28 is suppressed whereby the reduction of insulation between the stator core 12 and the inserted coil segments 52 is suppressed.

In the coil inserting apparatus 80 according to the present embodiment, the pressing device 30 includes the shaft member 34 and the pivot member 40 that is provided with the first and second extending portions 42, 44 each extending in the direction away from the side of the axial end portion 12*a* toward the other axial end portion 12*b*, such that the first and second extending portions 42, 44 are pivotable about the axis C2 of the shaft member 34. Further, when the pressing device 30 is moved in the direction of the axis C1 and the distal end portion 42*t* of the first extending portion 42 is brought into contact with the axial end portion 12*a* of the stator core 12, the first and second extending portions 42, 44 are pivoted and the distal end portion 44*t* of the second extending portion 44 presses the insulation sheet 28 against the pair of side surfaces 16*s* of the slot 14. When the distal end portion 42*t* of the first extending portion 42 is brought into contact with the axial end portion 12*a* of the stator core 12 as a result of movement of the pressing device 30 in the direction of the axis C1, the pivot member 40 is pivoted such that the distal end portion 44*t* of the second extending portion 44 is automatically caused to press the insulation sheet 28 against a corresponding one of the side surfaces 16*s*. Thus, with the coil inserting apparatus 80 being provided with the pivot member 40 that is simple in construction, it is possible to automatically cause the insulation sheet 28 to be pressed against the pair of side surfaces 16*s* of the slot 14.

Second Embodiment

Figure 9:
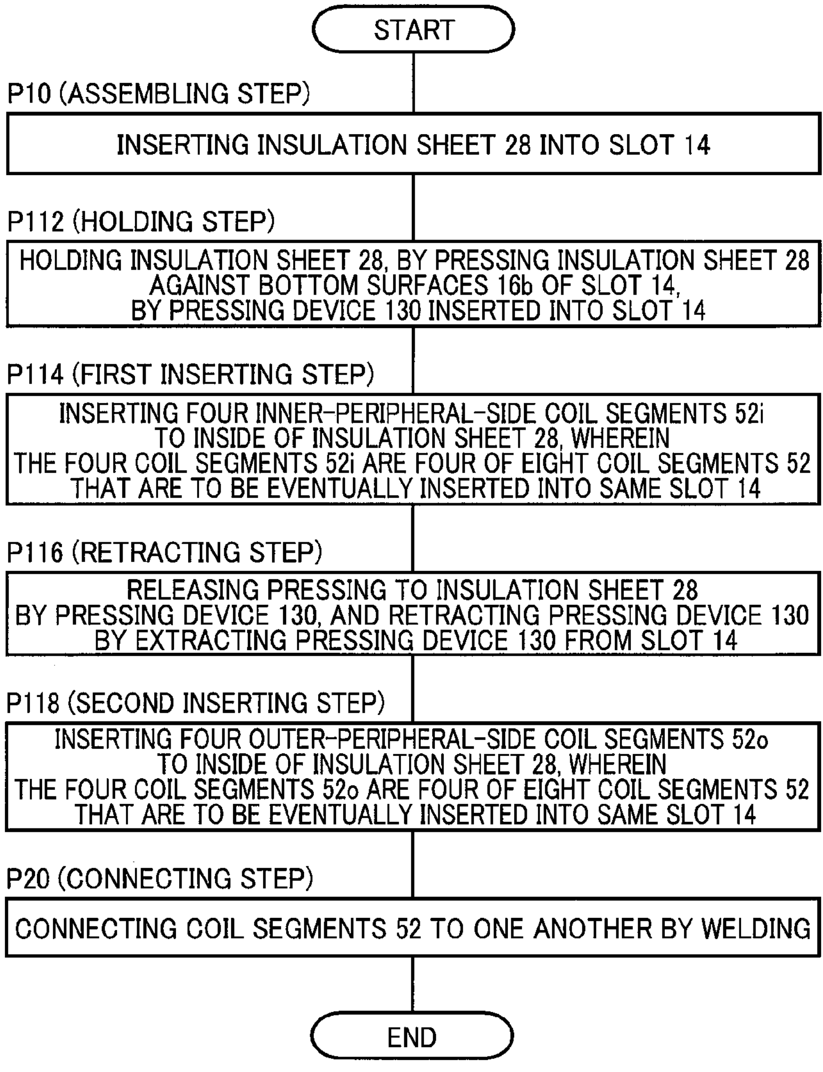
FIG. 9 is a diagram for explaining each step of the method of manufacturing the stator, according to a second embodiment of the present invention.

FIG. 9 is a diagram for explaining each step of the method of manufacturing the stator 10, according to a second embodiment of the present invention. The method of manufacturing the stator 10, according to this second embodiment is substantially the same as that according to the above-described first embodiment, but is different from that according to the first embodiment in that the holding step P12, first inserting step P14, retracting step P16 and second inserting step P18 are replaced by a holding step P112, a first inserting step P114, a retracting step P116 and a second inserting step P118. Further, in this second embodiment, the stator 10 in which the coil segments 52 are inserted into insulation sheets 28 disposed in the slots 14, is manufactured by a coil inserting apparatus 180 in place of the coil inserting apparatus 80. The same reference signs as used in the first embodiment will be used in the description of this second embodiment, to identify the functionally corresponding elements, and descriptions thereof are not provided.

The holding step P112 is substantially the same as the holding step P12 in the first embodiment, but is different from the holding step P12 in that the insulation sheet 28 disposed in each slot 14 is held by being pressed by a pressing device 130 against the bottom surface 16*b*. In connection with this difference, the pressing device 130 of this second embodiment is different in construction from the pressing device 30 of the first embodiment. The first inserting step P114 is substantially the same as the first inserting step P14 in the first embodiment, but is different from the first inserting step P14 in that the four inner-peripheral-side coil segments 52*i* are inserted to the inside of the insulation sheet 28, wherein the four inner-peripheral-side coil segments 52*i* are four of the eight coil segments 52 that are to be eventually inserted into each slot 14. The retracting step P116 is substantially the same as the retracting step P16 in the first embodiment, but is different from the retracting step P16 in a manner of retracting the pressing device 130 due to the difference of the pressing device 130 in construction from the pressing device 30 in the first embodiment. The second inserting step P118 is substantially the same as the second inserting step P18, but is different from the second inserting step P18 in that the four outer-peripheral-side coil segments 52*o* are inserted to the inside of the insulation sheet 28, wherein the four outer-peripheral-side coil segments 52*o* are four of the eight coil segments 52 that are to be eventually inserted into each slot 14. It is noted that the inner-peripheral-side coil segments 52*i* and the outer-peripheral-side coil segments 52*o* correspond to “first segment portion” and “second segment portion”, respectively.

Figure 10:
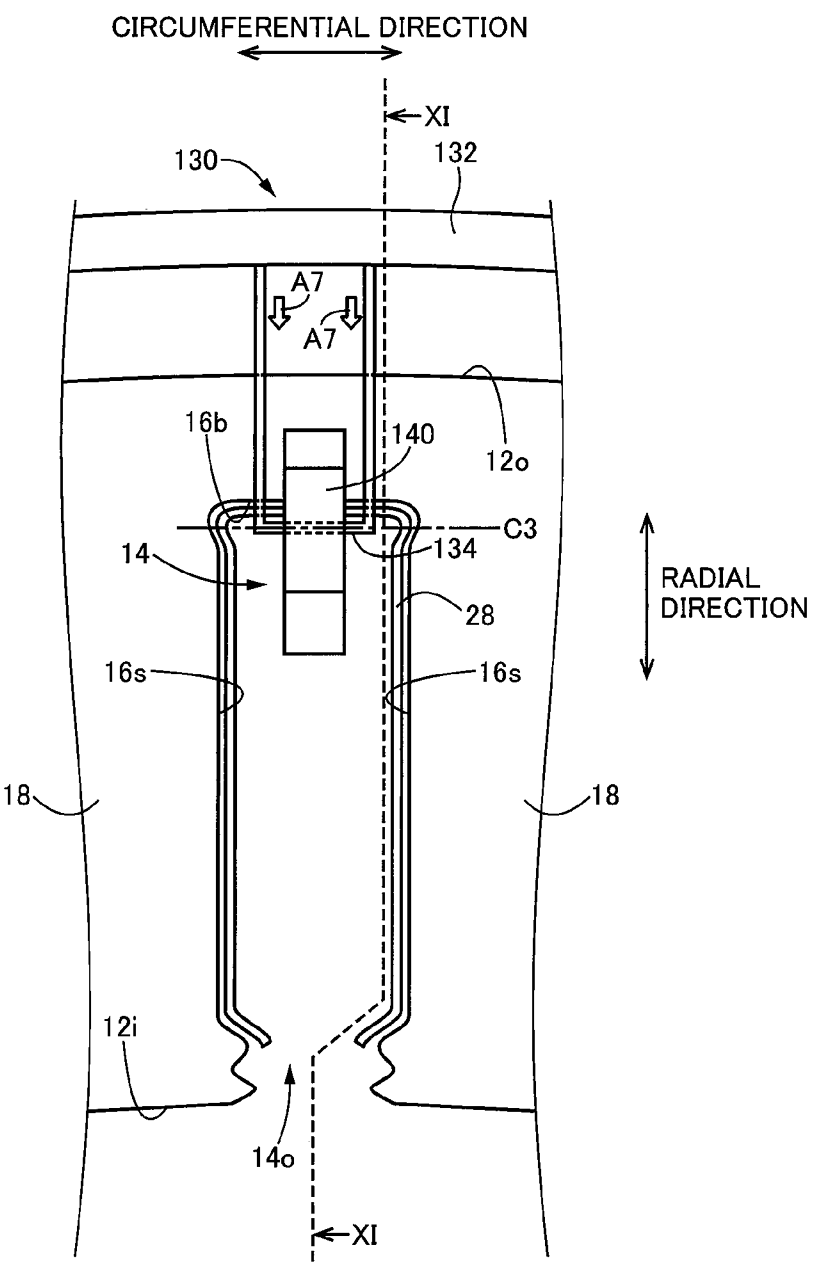
FIG. 10 a view for explaining a holding step shown in FIG. 9.
Figure 11:
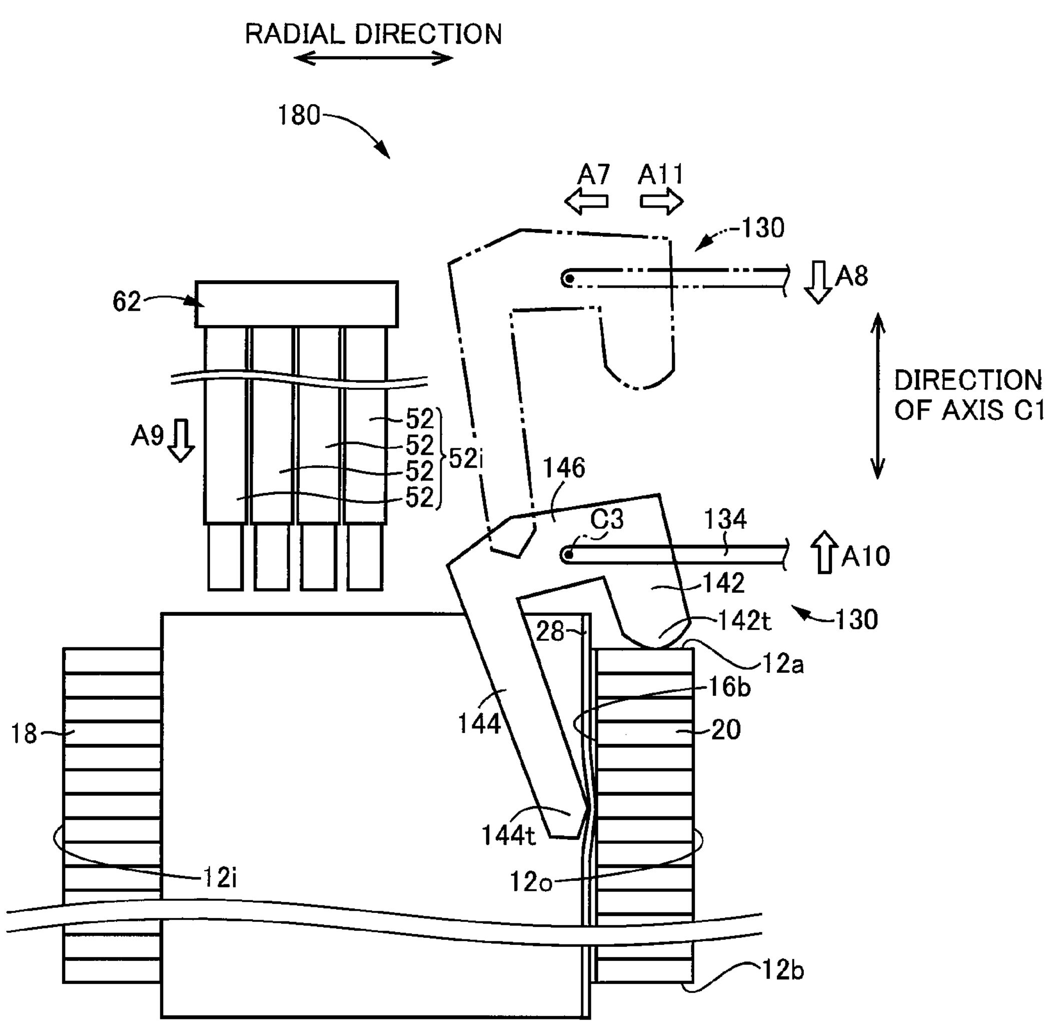
FIG. 11 is a view for explaining the holding step, a first inserting step and a retracting step shown in FIG. 9.

FIG. 10 a view for explaining the holding step P112 shown in FIG. 9. FIG. 11 is a view for explaining the holding step P112, the first inserting step P114 and the retracting step P116 shown in FIG. 9, wherein the view of FIG. 11 is a cross sectional view taken in line XI-XI shown in FIG. 10.

The coil inserting apparatus 180 is substantially the same in construction as the coil inserting apparatus 80, but is different from the coil inserting apparatus 80 in that the pressing device 130 is provided in place of the pressing device 30. The coil inserting apparatus 180 corresponds to “apparatus” recited in the appended claims. It is noted that the direction of the axis C1 corresponds to a vertical direction in a stage shown in each of FIGS. 10-12.

The pressing device 130 includes an annular-shaped support member 132, shaft members 134 and pivot members 140, wherein a set of the shaft member 134 and the pivot member 140 are provided for each one of the slots 14. The shaft member 134 is provided in a position of a corresponding one of the slots 14, and protrudes from the annular-shaped support member 132 inwardly in the radial direction. The pivot member 140 is pivotable about an axis C3 of the shaft member 134, wherein the axis C3 is perpendicular to the radial direction and the axis C1. The annular-shaped support member 132 is an annular member disposed outside the outer circumferential surface 12*o* of the stator core 12, for example.

Figure 12:
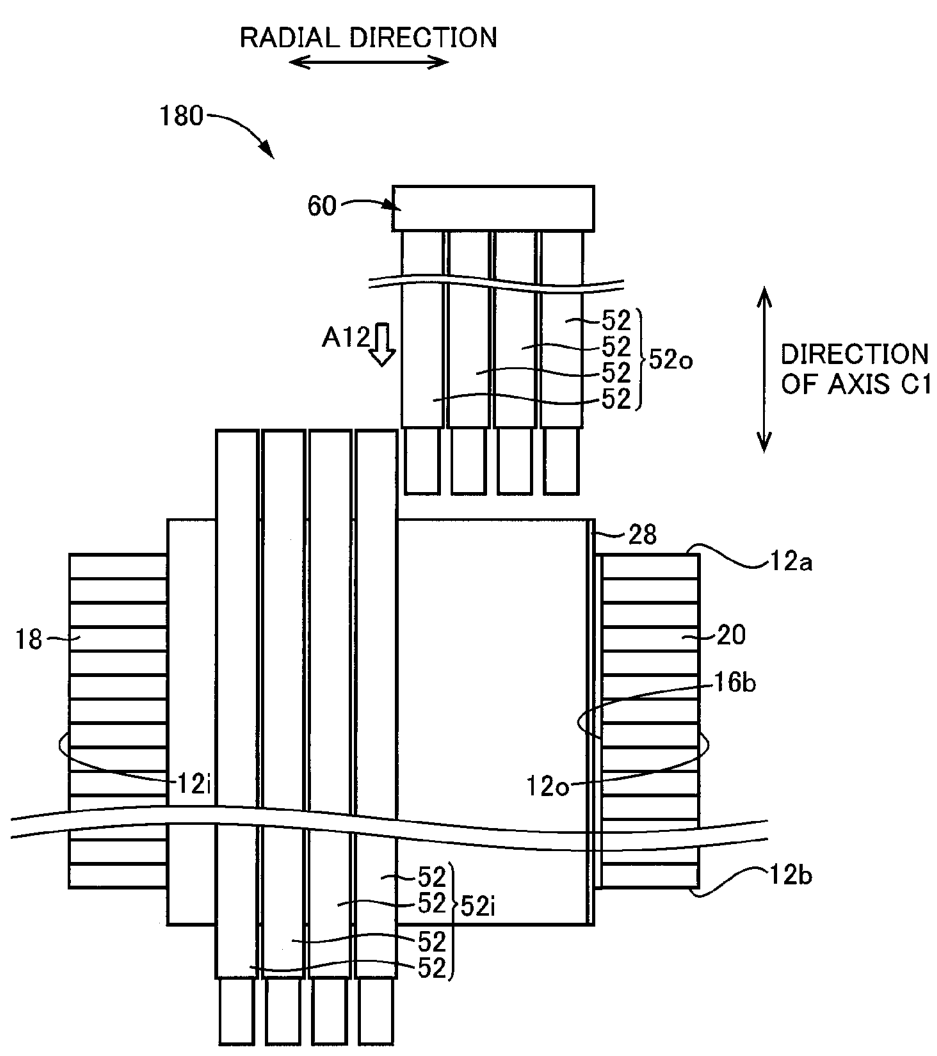
FIG. 12 is a view for explaining a second inserting step shown in FIG. 9.

The pressing device 130 is movable in the direction of the axis C1, i.e., in the vertical direction in FIGS. 11 and 12. The shaft member 134 is extendable from the annular-shaped support member 132 inwardly in the radial direction and retractable toward the annular-shaped support member 132 outwardly in the radial direction, for example, by operation of an actuator (not shown). The pivot member 140 includes first and second extending portions 142, 144 and a connecting portion 146. Each of the first and second extending portions 142, 144 extends generally in the direction of the axis C1 from a side of the axial end portion 12*a* toward the other axial end portion 12*b*. The connecting portion 146 connects between proximal end portions of the respective first and second extending portions 142, 144. It is preferable that the second extending portion 144 extends from the side of the axial end portion 12*a* more than the first extending portion 142, toward the other axial end portion 12*b*. The connecting portion 146 is supported by the shaft member 134. The shaft member 134 includes a support portion which extends in a direction of the axis C3 and which supports the pivot member 140, and a pair of supported portions which extend from respective opposite ends of the support portion outwardly in the radial direction and which are supported by the annular-shaped support member 132.

In this second embodiment, the inner-peripheral-side inserting device 62 and the outer-peripheral-side inserting device 60 correspond to “first inserting device” and “second inserting device”, respectively, which are recited in the appended claims.

Firstly, as indicated by arrow A7 in FIG. 11, the shaft member 134 is caused to extend from the annular-shaped support member 132 inwardly in the radial direction, while the pressing device 30 is positioned on an upper side of the axial end portion 12*a* in the vertical direction, so that the first extending portion 142 of the pivot member 140 is positioned right above the yoke portion 20 while the second extending portion 144 of the pivot member 140 is positioned right above a side of the bottom surface 16*b* of the corresponding slot 14, as seen from the vertical direction. Next, as indicated by arrow A8 in FIG. 11, the pressing device 130 is moved downwardly in the vertical direction, so that a distal end portion 144*t* of the second extending portion 144 is inserted into the corresponding slot 14 while a distal end portion 142*t* of the first extending portion 142 is brought into contact with the axial end portion 12*a* of the stator core 12 in the yoke portion 20. With the distal end portion 142*t* of the first extending portion 142 being brought into contact with the axial end portion 12*a*, the pivot member 140 is pivoted and accordingly the distal end portion 144*t* of the second extending portion 144 is caused to press the insulation sheet 28 against the bottom surface 16*b* of the corresponding slot 14. It is noted that the distal end portion 142*t* and the distal end portion 144*t* correspond to “distal end portion (of the first extending portion)” and “distal end portion (of the second extending portion)”, respectively, which are recited in the appended claims.

The first inserting step P114 is a step implemented to cause the inner-peripheral-side inserting device 62 to insert the four inner-peripheral-side coil segments 52*i* to the inside of the insulation sheet 28 from the side of the axial end portion 12*a* of the stator core 12 toward the other axial end portion 12*b* of the stator core 12, in a position distant from the pressing device 130 that holds the insulation sheet 28, namely, in a position inwardly of the pressing device 130 in the radial direction within the corresponding slot 14, as indicated by arrow A9 shown in FIG. 11.

After the first inserting step P114, the retracting step P116 is implemented to move the pressing device 130 upwardly in the vertical direction, as indicated by arrow A10 shown in FIG. 11, and then to retract the shaft member 134 outwardly in the radial direction (toward the annular-shaped support member 132) while the pressing device 130 is in a position located on the upper side of the axial end portion 12*a* in the vertical direction, as indicated by arrow A11 shown in FIG. 11. Thus, the pressing device 130 is retracted from a position in which the four outer-peripheral-side coil segments 52*o* are to be inserted to the inside of the insulation sheet 28 as described below.

FIG. 12 is a view for explaining the second inserting step P118 shown in FIG. 9. After the retracting step P116, the second inserting step P118 is implemented to cause the outer-peripheral-side inserting device 60 to insert the four outer-peripheral-side coil segments 52*o* to the inside of the insulation sheet 28 from the side of the axial end portion 12*a* toward the other axial end portion 12*b*, in the position in which the pressing device 130 has been extracted from the corresponding slot 14, as indicated by arrow A12 shown in FIG. 12.

In the method of manufacturing the stator 10, according to the present second embodiment, there are provided (a) the holding step P112 of holding the insulation sheet 28, which is disposed in the slot 14 provided in the stator core 12, by causing the pressing device 130 to press the insulation sheet 28 against the bottom surface 16*b* of the slot 14 in the axial end portion 12*a* of the stator core 12, (b) the first inserting step P114 of inserting the inner-peripheral-side coil segments 52*i* of the coil 50 to the inside of the insulation sheet 28 from the side of the axial end portion 12*a* of the stator core 12, in the position distant from the pressing device 130 that presses the insulation sheet 28 against the bottom surface 16*b* of the slot 14, and (c) the retracting step P116 of retracting the pressing device 130 by extracting the pressing device 130 from the slot 14, after the first inserting step P114. Therefore, with the insulation sheet 28 being pressed against the bottom surface 16*b* of the slot 14, the occurrence of misalignment of the insulation sheet 28 is suppressed when the inner-peripheral-side coil segments 52*i* are inserted from the side of the axial end portion 12*a* of the stator core 12, so that the reduction of insulation between the stator core 12 and the inserted coil segments 52 is suppressed.

In the method of manufacturing the stator 10, according to the present second embodiment, the second inserting step P118 is additionally provided to insert the outer-peripheral-side coil segments 52*o* to the inside of the insulation sheet 28, in the position in which the pressing device 130 has been extracted from the slot 14 in the retracting step P116. In this arrangement in which the outer-peripheral-side coil segments 52*o* are inserted to the inside of the insulation sheet 28 in the position in which the pressing device 130 has been extracted from the slot 14, as compared with in an arrangement in which the outer-peripheral-side coil segments 52*o* are not inserted to the inside of the insulation sheet 28, it is possible to increase a number of the coil segments 52, which are to be inserted into the same slot 14.

In the coil inserting apparatus 180 according to the present second embodiment, there are provided (a) the pressing device 130 configured to hold the insulation sheet 28, which is disposed in the slot 14 provided in the stator core 12, by pressing the insulation sheet 28 against the bottom surface 16*b* of the slot 14 in the axial end portion 12*a* of the stator core 12; and (b) the inner-peripheral-side inserting device 62 configured to insert the inner-peripheral-side coil segments 52*i* of the coil 50 to the inside of the insulation sheet 28 from the side of the axial end portion 12*a* of the stator core 12 toward the other axial end portion 12*b* of the stator core 12, in the position distant from the pressing device 130 that presses the insulation sheet 28 against the bottom surface 16*b* of the slot 14. With the pressing device 130 being caused to press the insulation sheet 28 against the bottom surface 16*b* of the slot 14 in the axial end portion 12*a* of the stator core 12, the occurrence of misalignment of the insulation sheet 28 is suppressed when the inner-peripheral-side coil segments 52*i* are inserted from the side of the axial end portion 12*a* of the stator core 12, so that the reduction of insulation between the stator core 12 and the inserted coil segments 52 is suppressed.

In the coil inserting apparatus 180 according to the present second embodiment, there is further provided the outer-peripheral-side inserting device 60 that is configured to insert the outer-peripheral-side coil segments 52*o* of the coil 50 to the inside of the insulation sheet 28, in the position in which the pressing device 130 has been extracted from the slot 14. In this arrangement, as compared with in an arrangement in which the outer-peripheral-side coil segments 52*o* are not inserted to the inside of the insulation sheet 28, it is possible to increase the number of coil segments 52, which are to be inserted into the same slot 14.

In the coil inserting apparatus 180 according to the present second embodiment, the pressing device 130 includes the shaft member 134 and the pivot member 140 that is provided with the first and second extending portions 142, 144 each extending in the direction away from the side of the axial end portion 12*a* toward the other axial end portion 12*b*, such that the first and second extending portions 142, 144 are pivotable about the axis C3 of the shaft member 134. Further, when the pressing device 130 is moved in the direction of the axis C1 and the distal end portion 142*t* of the first extending portion 142 is brought into contact with the axial end portion 12*a* of the stator core 12, the first and second extending portions 142, 144 are pivoted and the distal end portion 144*t* of the second extending portion 144 presses the insulation sheet 28 against the bottom surface 16*b* of the slot 14. When the distal end portion 142*t* of the first extending portion 142 is brought into contact with the axial end portion 12*a* of the stator core 12 as a result of movement of the pressing device 130 in the direction of the axis C1, the pivot member 140 is pivoted such that the distal end portion 144*t* of the second extending portion 144 is automatically caused to press the insulation sheet 28 against the bottom surfaces 16*b*. Thus, with the coil inserting apparatus 180 being provided with the pivot member 140 that is simple in construction, it is possible to automatically cause the insulation sheet 28 to be pressed against the bottom surface 16*b* of the slot 14.

While the preferred embodiments of this invention have been described in detail by reference to the drawings, it is to be understood that the invention may be otherwise embodied.

In the above-described first and second embodiments, the first inserting step (P14; P114) is implemented to insert the four outer-peripheral-side coil segments 52*o* or four inner-peripheral-side coil segments 52*i* to the inside of the insulation sheet 28 disposed in each slot 14. However, this arrangement is not essential to the present invention. For example, in the first inserting step (P14; P114), the number of the coil segments 52 to be inserted to the inside of the insulation sheet 28 disposed in each slot 14 may be also one or any number other than four. Similarly, in the second inserting step (P18; P118), the number of the coil segments 52 to be inserted to the inside of the insulation sheet 28 disposed in each slot 14 does not necessarily have to be four but may be also one or any number other than four.

In the above-described first and second embodiments, the retracting step (P16; P116) is followed by the second inserting step (P18; P118). However, the second inserting step (P18; P118) does not necessarily have to be implemented. Even in an arrangement without implementation of the second inserting step (P18; P118), as long as the outer-peripheral-side coil segments 52*o* (in the first embodiment) or the inner-peripheral-side coil segments 52*i* (in the second embodiment) are inserted from the side of the axial end portion 12*a* of the stator core 12 by implementation of the first inserting step (P16; P116), occurrence of misalignment of the insulation sheet 28 is suppressed whereby reduction of the insulation between the stator core 12 and the inserted coil segments 52 is suppressed.

In the above-described first embodiment, the holding step P12 is implemented to hold the insulation sheet 28 by the pressing device 30 that is operated to press the insulation sheet 28 against the pair of side surfaces 16*s* of each slot 14. However, the holding step P12 may be modified such that the insulation sheet 28 may be held by causing the pressing device 30 to press the insulation sheet 28 against at least one of the side surfaces 16*s*, for example. In this modified arrangement, too, as long as the outer-peripheral-side coil segments 52*o* are inserted from the side of the axial end portion 12*a* of the stator core 12, the occurrence of misalignment of the insulation sheet 28 is suppressed and the reduction of the insulation between the stator core 12 and the inserted coil segments 52 is suppressed, as compared with an arrangement in which the holding step P12 is not implemented.

In the above-described first embodiment, the holding step P12 is implemented to hold the insulation sheet 28 by the pressing device 30 operated to press the insulation sheet 28 against the inner wall surface 16 of each slot 14 on the side of the opening 14*o*, namely, in an inner end portion of each slot 14 in the radial direction. However, this arrangement may be modified such that the holding step P12 is implemented to hold the insulation sheet 28 by the pressing device 30 operated to press the insulation sheet 28 against the inner wall surface 16 of each slot 14 on the side of the bottom surface 16*b*, namely, in an outer end portion of each slot 14 in the radial direction. In this modified arrangement, in the first inserting step P14, the inner-peripheral-side coil segments 52*i* in place of the outer-peripheral-side coil segments 52*o* are inserted from the side of the axial end portion 12*a*. In this modified arrangement, too, as long as the inner-peripheral-side coil segments 52*i* are inserted from the side of the axial end portion 12*a*, the occurrence of misalignment of the insulation sheet 28 is suppressed and the reduction of the insulation between the stator core 12 and the inserted coil segments 52 is suppressed, as compared with an arrangement in which the holding step P12 is not implemented.

In the above-described first embodiment, the coil inserting apparatus 80 includes the inner-peripheral-side inserting device 62 configured to insert the inner-peripheral-side coil segments 52*i* in the position in which the pressing device 30 has been extracted from the corresponding slot 14. In the above-described second embodiment, the coil inserting apparatus 180 includes the outer-peripheral-side inserting device 60 configured to insert the outer-peripheral-side coil segments 52*o* in the position in which the pressing device 130 has been extracted from the corresponding slot 14. However, the coil inserting apparatus 80 does not necessarily have to include the inner-peripheral-side inserting device 62 in the first embodiment, and the coil inserting apparatus 180 does not necessarily have to include the outer-peripheral-side inserting device 60 in the second embodiment. In these modified arrangements without the inner-peripheral-side inserting device 62 being included in the coil inserting apparatus 80 (in the first embodiment) or without the outer-peripheral-side inserting device 60 being included in the coil inserting apparatus 180 (in the second embodiment), too, as long as the outer-peripheral-side coil segments 52*o* (in the first embodiment) or the inner-peripheral-side coil segments 52*i* (in the second embodiment) are inserted from the side of the axial end portion 12*a* of the stator core 12, the occurrence of misalignment of the insulation sheet 28 is suppressed and accordingly the reduction of the insulation between the stator core 12 and the inserted coil segments 52 is suppressed.

In the above-described first and second embodiments, the pressing device (30; 130) of the coil inserting apparatus (80; 180) includes the shaft members (34; 134) and the pivot members (40; 140). However, this construction of the pressing device (30; 130) is not essential as long as the pressing device (30; 130) has any construction that make it possible to hold the insulation sheet 28, which is disposed in each slot 14 provided in the stator core 12, by pressing the insulation sheet 28 against the inner wall surface 16 of each slot 14 in the axial end portion 12*a* of the stator core 12.

In the above-described first and second embodiments, the direction of the axis C1 corresponds to the vertical direction as shown in FIGS. 6-8, 11 and 12. However, the present invention may be carried out in an arrangement in which the direction of the axis C1 corresponds to a horizontal direction, for example. In such an arrangement, the pivot member 40 may be forced or biased by a spring or the like (not shown), for example, until the distal end portion (42*t*; 142*t*) of the first extending portion (42; 142) is brought into contact with the axial end portion 12*a* of the stator core 12, such that the first extending portion (42; 142) overlaps with the corresponding tooth portion 18 or the yoke portion 20 of the stator core 12 while the second extending portion (44; 144) overlaps with the corresponding slot 14, as seen from the direction of the axis C1, i.e., the horizontal direction.

In the above-described first and second embodiments, the coil 50 is wound in a distributed winding. However, the present invention is applicable also where the coil 50 is wound in a concentrated winding.

In the above-described first and second embodiments, the rotary electric machine MG is of an inner rotor type. However, the rotary electric machine MG may be of an outer rotor type. Where the rotary electric machine MG is of an outer rotor type in the first and second embodiments, the terms "inner peripheral side", "outer peripheral side", "inner circumferential surface (of the stator core 12)" and "outer circumferential surface (of the stator core 12)" are read as the "outer peripheral side", "inner peripheral side", "outer circumferential surface (of the stator core 12)" and "inner circumferential surface (of the stator core 12)", respectively.

In the above-described embodiments, the rotary electric machine MG is the motor generator serving as the drive power source for driving the vehicle. However, the rotary electric machine MG does not necessarily have to be the motor generator, but may be, for example, an electric motor having only a function of driving the vehicle without having a function of generating the electric power, or an electric power generator having only the function of generating the electric power without having the function of driving the vehicle.

It is to be understood that the embodiments described above are given for illustrative purpose only, and that the present invention may be embodied with various modifications and improvements which may occur to those skilled in the art.

NOMENCLATURE OF ELEMENTS

- 10: stator
- 12: stator core
- 12*a*: axial end portion
- 14: slot
- 14*o*: opening
- 16: inner surface (inner surface of slot)
- 16*b*: bottom surface
- 16*s*: pair of side surfaces
- 28: insulation sheet
- 30;130: pressing device
- 34; 134: shaft member
- 40; 140: pivot member
- 42; 142: first extending portion
- 42*t*; 142*t*: distal end portion (distal end portion of first extending portion)
- 44; 144: second extending portion
- 44*t*; 144*t*: distal end portion (distal end portion of second extending portion)
- 52*i*: inner-peripheral-side coil segment (first segment portion, second segment portion)
- 52*o*: outer-peripheral-side coil segment (first segment portion, second segment portion)
- 60: outer-peripheral-side inserting device (first inserting device, second inserting device)
- 62: inner-peripheral-side inserting device (first inserting device, second inserting device)
- 80; 180: coil inserting apparatus (apparatus)
- C1: axis (axis)
- P12; P112: holding step
- P14; P114: first inserting step
- P16; P116: retracting step
- P18; P118: second inserting step

What is claimed is:

1. A method of manufacturing a stator that includes a tubular-shaped stator core and a tubular-shaped coil, the method comprising:

a holding step of holding an insulation sheet, which is disposed in a slot provided in the stator core, by causing a pressing device to press the insulation sheet against an inner surface of the slot in an axial end portion of the stator core;

a first inserting step of inserting a first segment portion of the coil to an inside of the insulation sheet from a side of the axial end portion of the stator core, in a position distant from the pressing device that presses the insulation sheet against the inner surface of the slot;

a retracting step of retracting the pressing device by extracting the pressing device from the slot, after the first inserting step;

a second inserting step, which is implemented after implementation of the first inserting step, to insert a second segment portion of the coil that is other than the first segment portion, to the inside of the insulation sheet, in a position in which the pressing device has been extracted from the slot in the retracting step.

2. The method according to claim 1, wherein the holding step is implemented by causing the pressing device to press the insulation sheet against a pair of side surfaces as portions of the inner surface of the slot which are opposed to each other in a circumferential direction of the stator core.

3. The method according to claim 2, wherein the holding step is implemented by causing the pressing device to press the insulation sheet against the pair of side surfaces, on a side of one of inner and outer circumferential surfaces of the stator core in which the slot opens.

4. The method according to claim 1, wherein the holding step is implemented by causing the pressing device to press the insulation sheet against a bottom surface as a portion of the inner surface of the slot which connects between ends of a pair of side surfaces as portions of the inner surface of the slot which are opposed to each other in a circumferential direction of the stator core.

5. The method according to claim 1, wherein the pressing device includes a generally-U-shaped pivot member including a first extending portion, a second extending portion and a connecting portion connecting between the first and second extending portions, such that the pivot member is pivotable about a pivot axis which is located in the connecting portion and which is parallel to the inner surface of the slot and an axially end surface of the stator core, and wherein the holding step is implemented by moving the pivot member from outside of the stator core in an axial direction of the stator core toward the stator core, such that the first extending portion is brought into contact with the axially end surface of the stator core whereby the pivot member is pivoted about the pivot axis so as to cause the second extending portion to press the insulation sheet against the inner surface of the slot.

* * * * *